US012600235B2

(12) United States Patent
Tsuda

(10) Patent No.: US 12,600,235 B2
(45) Date of Patent: Apr. 14, 2026

(54) VEHICLE DISPLAY CONTROL DEVICE, VEHICLE DISPLAY CONTROL METHOD, AND NON-TRANSITORY RECORDING MEDIUM

(71) Applicant: TOYOTA JIDOSHA KABUSHIKI KAISHA, Toyota (JP)

(72) Inventor: Hideki Tsuda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 18/510,016

(22) Filed: Nov. 15, 2023

(65) Prior Publication Data

US 2024/0190247 A1 Jun. 13, 2024

(30) Foreign Application Priority Data

Dec. 7, 2022 (JP) ................................. 2022-195817

(51) Int. Cl.
*B60K 35/235* (2024.01)
*B60K 35/28* (2024.01)
*G06V 20/56* (2022.01)

(52) U.S. Cl.
CPC .......... *B60K 35/235* (2024.01); *G06V 20/588* (2022.01); *B60K 35/28* (2024.01); *B60K 2360/176* (2024.01); *B60K 2360/177* (2024.01)

(58) Field of Classification Search
CPC .. B60K 35/00; B60K 35/28; B60K 2360/176; B60K 2360/177; G06V 20/588
See application file for complete search history.

(56) References Cited

U.S. PATENT DOCUMENTS

| | | | |
|---|---|---|---|
| 2018/0148072 A1 | 5/2018 | Kamiya et al. | |
| 2018/0247138 A1* | 8/2018 | Kang | G08G 1/165 |
| 2018/0373941 A1* | 12/2018 | Kwant | G08G 1/0145 |
| 2020/0125860 A1* | 4/2020 | Hyun | G06T 7/11 |

FOREIGN PATENT DOCUMENTS

| | | |
|---|---|---|
| JP | 2016-110627 A | 6/2016 |
| JP | 2020-102241 A | 7/2020 |
| JP | 2020-128172 A | 8/2020 |
| JP | 2021-026693 A | 2/2021 |

* cited by examiner

*Primary Examiner* — Navid Z. Mehdizadeh
*Assistant Examiner* — Oliver Tan
(74) *Attorney, Agent, or Firm* — OLIFF PLC

(57) ABSTRACT

The present disclosure provides a vehicle display control device including a processor and an image forming section configured to form an AR image having a shape that conforms to a dividing line of a lane in which a vehicle travels, using information from a sensor that recognizes the dividing line, wherein the processor is configured to control the image forming section so as to form the AR image, and determine a length, in an extension direction of the lane, of the AR image that the image forming section is caused to form, based on a reliability of a detection result of the sensor.

9 Claims, 6 Drawing Sheets

26

261

262

DRIVING ASSISTANCE CONTROL SECTION

HUD CONTROL SECTION

VEHICLE DISPLAY CONTROL DEVICE, VEHICLE DISPLAY CONTROL METHOD, AND NON-TRANSITORY RECORDING MEDIUM

CROSS-REFERENCE TO RELATED APPLICATION

This application is based on and claims priority under 35 USC 119 from Japanese Patent Application No. 2022-195817 filed on Dec. 7, 2022, the disclosure of which is incorporated by reference herein.

BACKGROUND

Technical Field

The present disclosure relates to a vehicle display control device, a vehicle display control method, and a non-transitory recording medium.

Related Art

Japanese Patent Application Laid-Open (JP-A) 2020-128172 discloses a vehicle including a head-up display capable of forming an AR image (virtual image) in a virtual display region. This AR image has a shape that conforms to a dividing line of a road, and is an image that an occupant recognizes as overlapping with the dividing line. Moreover, in a case in which the AR image is formed so as to overlap with an obstacle positioned on the dividing line, display of a portion of the AR image that overlaps with the object is limited.

In a case in which a camera of the vehicle is unable to accurately detect the shape of the dividing line, the AR image may be formed so as to overlap with an obstacle that is at a position that is separated from the dividing line. Thus, the invention of Japanese Patent Application Laid-Open (JP-A) No. 2020-128172 has room for improvement with regard to forming an AR image having a shape that conforms to a dividing line so as to make it less likely for the occupant of the vehicle to feel annoyance.

In consideration of the above facts, an object of the present disclosure is to provide a vehicle display control device, a vehicle display control method, and a non-transitory recording medium capable of forming an AR image having a shape that conforms to a dividing line so as to make it less likely for an occupant of a vehicle to feel annoyance.

SUMMARY

A vehicle display control device of a first aspect includes: a processor; and an image forming section configured to form an AR image having a shape that conforms to a dividing line of a lane in which a vehicle travels, using information from a sensor that recognizes the dividing line, wherein the processor is configured to control the image forming section so as to form the AR image, and determine a length, in an extension direction of the lane, of the AR image that the image forming section is caused to form, based on a reliability of a detection result of the sensor.

The image forming section of the vehicle display control device of the first aspect is controlled by the processor, and is capable of forming the AR image having a shape that conforms to the dividing line of the lane in which the vehicle travels, using information from the sensor that recognizes the dividing line. Moreover, based on the reliability of the detection result of the sensor, the processor determines the length, in the extension direction of the lane, of the AR image that the image forming section is caused to form. In a case in which the reliability of the detection result of the sensor is high, it is possible to form the AR image having a shape that conforms to the dividing line, at a desired position. Consequently, in such a case, there is a low probability that the AR image will be formed so as to overlap with an object that is at a position that is separated from the dividing line. On the other hand, in a case in which the reliability of the detection result of the sensor is low, by adjusting the length, in the extension direction of the lane, of the AR image, the probability that the AR image will overlap with an object that is at a position that is separated from the dividing line can be reduced. Accordingly, the vehicle display control device of the first aspect is capable of forming the AR image having a shape that conforms to the dividing line so as to make it less likely for the occupant of the vehicle to feel annoyance.

A vehicle display control device of a second aspect is the vehicle display control device of the first aspect, wherein the processor does not cause the image forming section to form the AR image, when the reliability is lower than a predetermined value.

The processor of the vehicle display control device of the second aspect does not cause the image forming section to form the AR image when the reliability of the detection result of the sensor is lower than the predetermined value. Consequently, there is no possibility that the vehicle display control device of the second aspect will form an AR image that overlaps with an object that is at a position that is separated from the dividing line, when the reliability is low.

A vehicle display control device of a third aspect is the vehicle display control device of the first aspect, wherein the lower the reliability is, the shorter the length of the AR image that the processor causes the image forming section to form is.

In the vehicle display control device of the third aspect, the lower the reliability of the detection result of the sensor is, the shorter the length of the AR image that the image forming section forms is. Consequently, in the vehicle display control device of the third aspect, there is a low probability that the AR image having a shape that conforms to the dividing line will be formed so as to cause the occupant of the vehicle to feel annoyance, when the reliability is low.

A vehicle display control method of a fourth aspect includes, by a processor: causing an image forming section to form an AR image having a shape that conforms to a dividing line of a lane in which a vehicle travels, using information from a sensor that recognizes the dividing line; and determining a length, in an extension direction of the lane, of the AR image that the image forming section is caused to form, based on a reliability of a detection result of the sensor.

A non-transitory recording medium of a fifth aspect is a non-transitory recording medium storing a program executable by a computer to perform processing, the processing including: causing an image forming section to form an AR image having a shape that conforms to a dividing line of a lane in which a vehicle travels, using information from a sensor that recognizes the dividing line; and determining a length, in an extension direction of the lane, of the AR image that the image forming section is caused to form, based on a reliability of a detection result of the sensor.

As described above, the vehicle display control device, the vehicle display control method, and the non-transitory recording medium according to the present disclosure have the excellent advantageous effect of enabling an AR image having a shape that conforms to a dividing line to be formed so as to make it less likely for an occupant of a vehicle to feel annoyance.

BRIEF DESCRIPTION OF THE DRAWINGS

Exemplary embodiments of the present disclosure will be described in detail based on the following figures, wherein.

DETAILED DESCRIPTION

Figure 1:
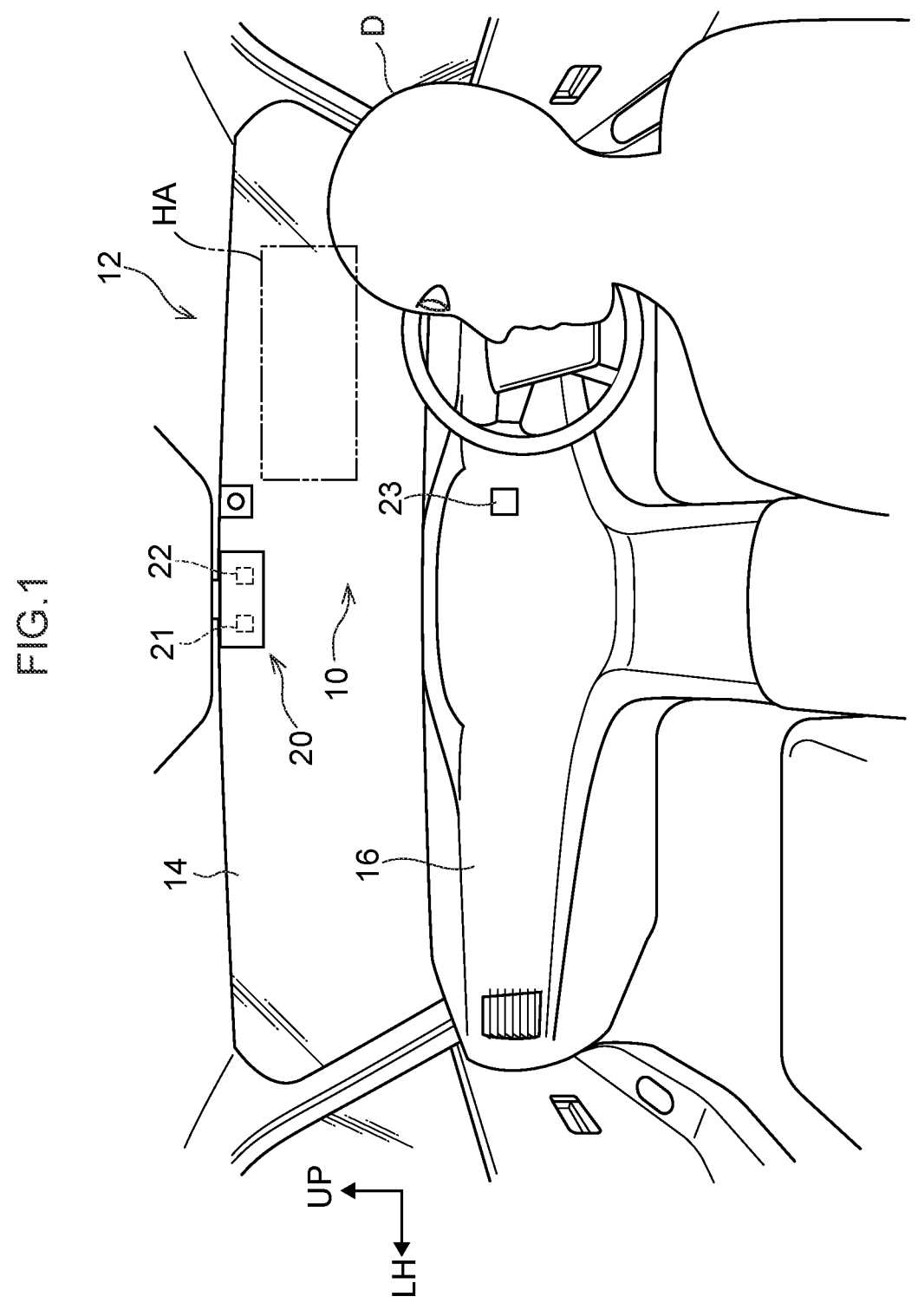
FIG. 1 is a diagram illustrating a vehicle interior of a vehicle including a vehicle display control device according to an exemplary embodiment.

Exemplary embodiments of a vehicle display control device 10 (hereafter referred to as a "control device 10"), a vehicle display control method, and a non-transitory recording medium according to the present disclosure will be explained below with reference to the drawings. An arrow FR illustrated in the drawings as appropriate indicates a front side in a vehicle front-rear direction, an arrow LH indicates a left side in a vehicle left-right direction, and an arrow UP indicates an upper side in a vehicle up-down direction.

As illustrated in FIG. 1, a vehicle 12 installed with the control device 10 of the present exemplary embodiment includes a front windshield 14 and an instrument panel 16. A sensor unit 20 is provided at an upper portion of a vehicle inside surface of the front windshield 14. The sensor unit 20 includes a camera (sensor) 21 and a millimeter-wave sensor 22. The camera 21 is capable of photographing a subject positioned ahead of the vehicle from the camera 21 itself. The millimeter-wave sensor 22 transmits scanning waves directed forward and receives reflected waves.

The instrument panel 16 is provided with a driving assistance operation device 23. The driving assistance operation device 23 is a device for causing the vehicle 12 to execute driving assistance control, which will be described later. When the driving assistance operation device 23 is in an ON state, the vehicle 12 is capable of executing driving assistance control. When the driving assistance operation device 23 is in an OFF state, the vehicle 12 is unable to execute driving assistance control.

Figure 2:
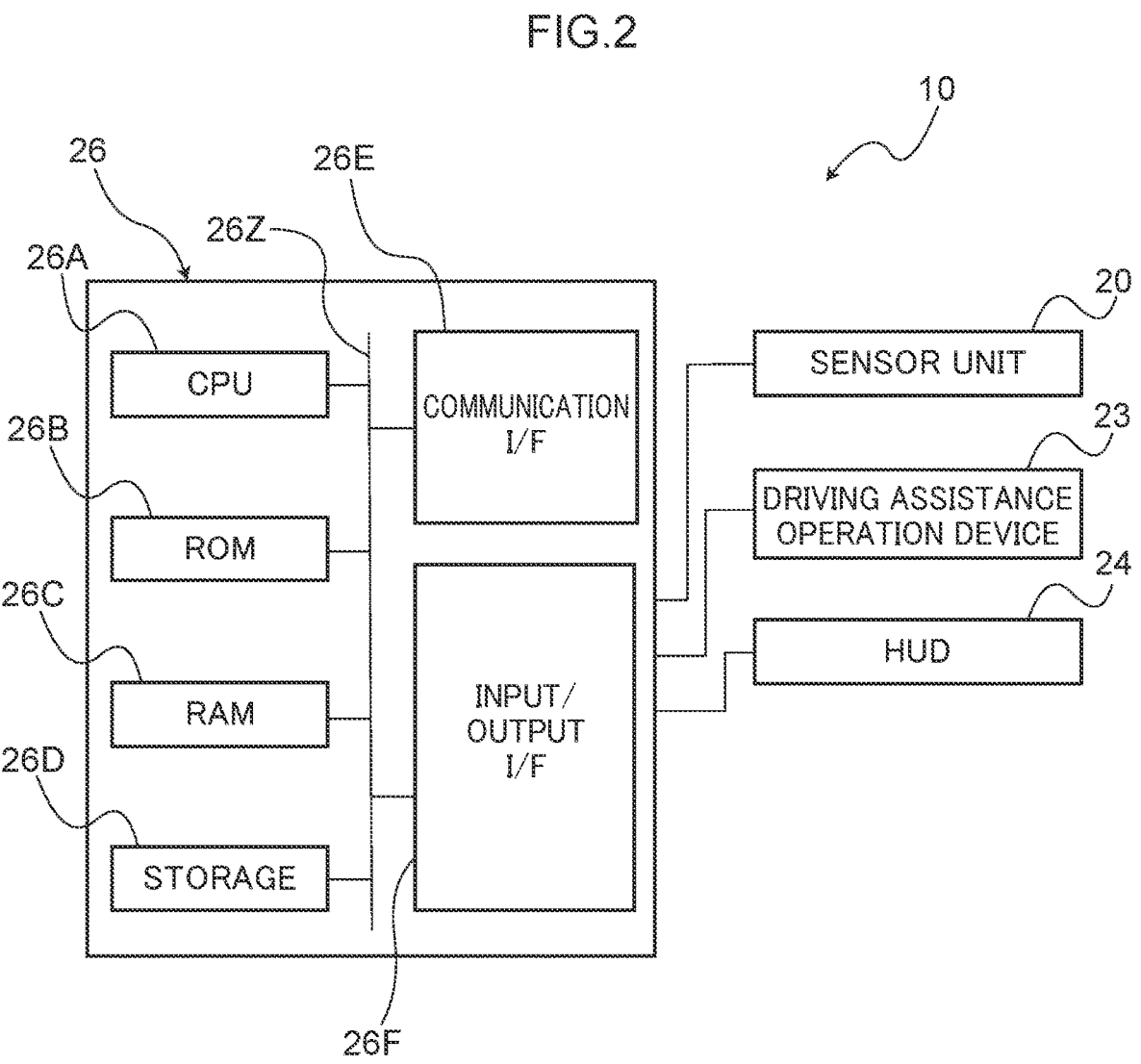
FIG. 2 is a diagram illustrating a hardware configuration of the vehicle illustrated in FIG. 1.

As illustrated in FIG. 2, the vehicle 12 includes an AR-HUD device (head-up display device) (image forming section) 24 (hereafter referred to as a "HUD") including a projection device.

As illustrated in FIG. 2, the vehicle 12 includes an electronic control unit (ECU) 26 as a hardware configuration.

The ECU 26 is configured to include a central processing unit (CPU) (processor) (computer) 26A, a read only memory (ROM) (non-transitory recording medium) (recording medium) 26B, a random access memory (RAM) 26C, a storage (non-transitory recording medium) (recording medium) 26D, a communication I/F 26E, and an input/output I/F 26F.

The CPU 26A, the ROM 26B, the RAM 26C, the storage 26D, the communication I/F 26E, and the input/output I/F 26F are connected so as to be capable of communicating with each other via an internal bus 26Z.

The CPU 26A is a central arithmetic processing unit, and the CPU 26A executes various programs and controls various sections. The CPU 26A reads a program from the ROM 26B or the storage 26D, and executes the program using the RAM 26C as a workspace. The CPU 26A carries out control of the respective configurations and various kinds of arithmetic processing according to programs recorded in the ROM 26B or the storage 26D.

The ROM 26B stores various programs and various data. The RAM 26C serves as a workspace to temporarily store programs and data. The storage 26D is configured by a storage device such as a hard disk drive (HDD), a solid state drive (SSD) or the like, and stores various programs and various data.

The communication I/F 26E is an interface for connecting to a different ECU (not illustrated in the drawings) from the ECU 26 via an external bus (not illustrated in the drawings). For example, a communication standard based on the CAN protocol is used for the interface.

The input/output I/F 26F is an interface for communicating with various devices. These devices include the sensor unit 20, the driving assistance operation device 23, the HUD 24, a sensor group (which will be described later), and an actuator group (which will be described later).

Figure 3:
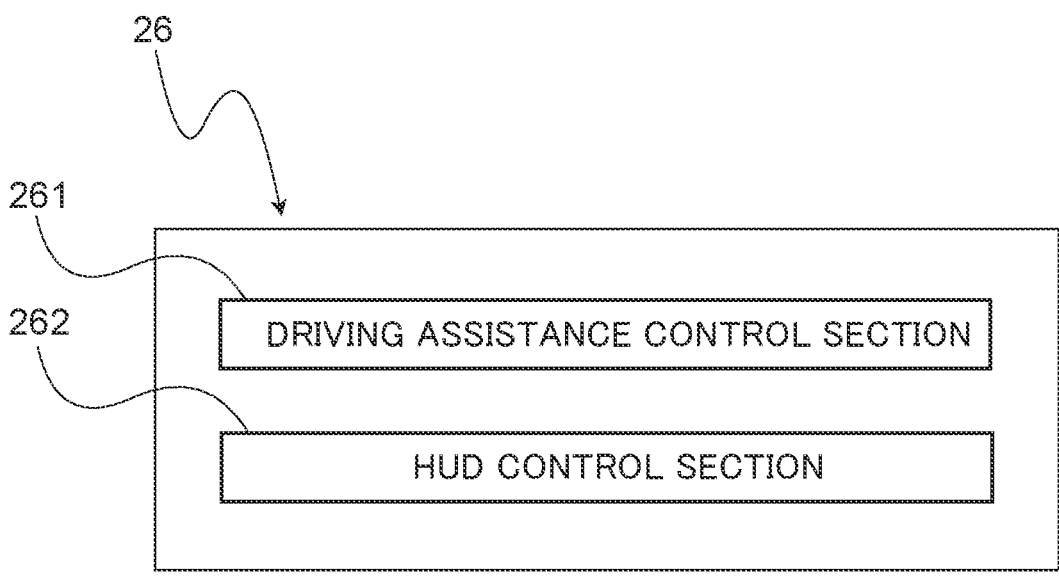
FIG. 3 is a functional block diagram of an ECU illustrated in FIG. 2.

FIG. 3 is a block diagram illustrating an example of a functional configuration of the ECU 26. The ECU 26 includes a driving assistance control section 261 and a HUD control section 262 as functional configuration. The driving assistance control section 261 and the HUD control section 262 are implemented by the CPU 26A reading and executing a program stored in the ROM 26B.

When the driving assistance operation device 23 is in the ON state, the driving assistance control section 261 uses the sensor group and the actuator group (not illustrated in the drawings) provided at the vehicle 12 to cause the vehicle 12 to execute driving assistance control at driving levels 1 to 5 determined by the Society of Automotive Engineers (SAE) (American Society of Automotive Engineers). Moreover, when the driving assistance operation device 23 is in the ON state, a driver (occupant) D (refer to FIG. 1) of the vehicle 12 can select the driving level and the driving assistance control to be executed, by operating the driving assistance operation device 23. The driving assistance control according to the present exemplary embodiment includes, for example, adaptive cruise control (ACC), lane tracing assistance (LTA, lane maintenance assistance control), and lane departure alert control (LDA). The sensor group provided at the vehicle 12 includes the sensor unit 20. The actuator group provided at the vehicle 12 includes electric actuators of a brake device and an electric steering device, an electric actuator for driving an internal combustion engine, which is a drive source, and an electric motor, which is a drive source.

The HUD control section 262 controls the HUD 24. The ROM 26B or the storage 26D of the ECU 26 stores projection object data including various characters, icons (graphics) and the like. The projection device of the HUD 24 controlled by the HUD control section 262 reads the projection object data from the ROM 26B or the storage 26D to project various types of AR images. These AR images include dividing line display images Imx1 and Imx2, which will be described later. Namely, the HUD 24 is an augmented reality head-up display (AR-HUD). The projected AR images are reflected forward by a reflecting section (not illustrated in the drawings) provided at the vehicle 12. Moreover, the AR images reflected forward by the reflecting section are formed as virtual images in a virtual display region HA (refer to FIG. 1) positioned in front of the front windshield 14.

Figure 4:
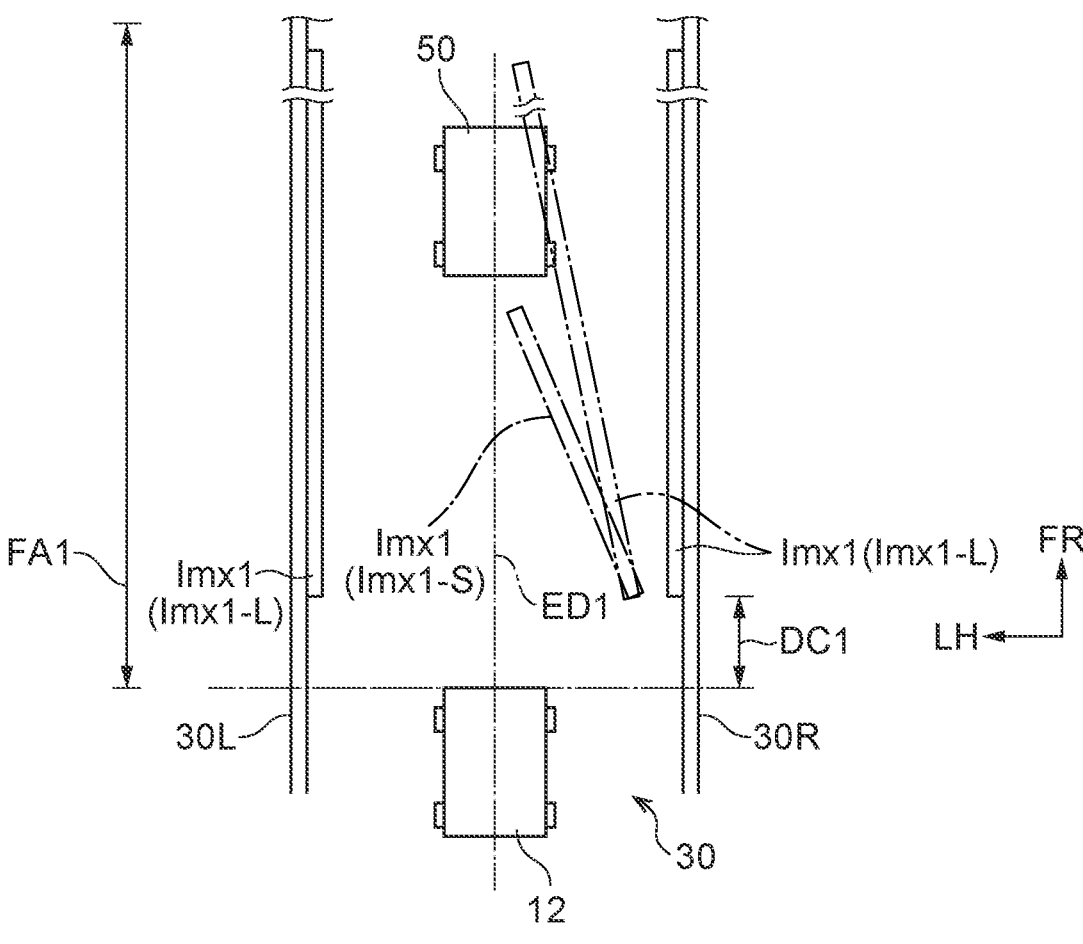
FIG. 4 is a schematic plan view of a straight road, a vehicle, and a preceding vehicle.
Figure 5:
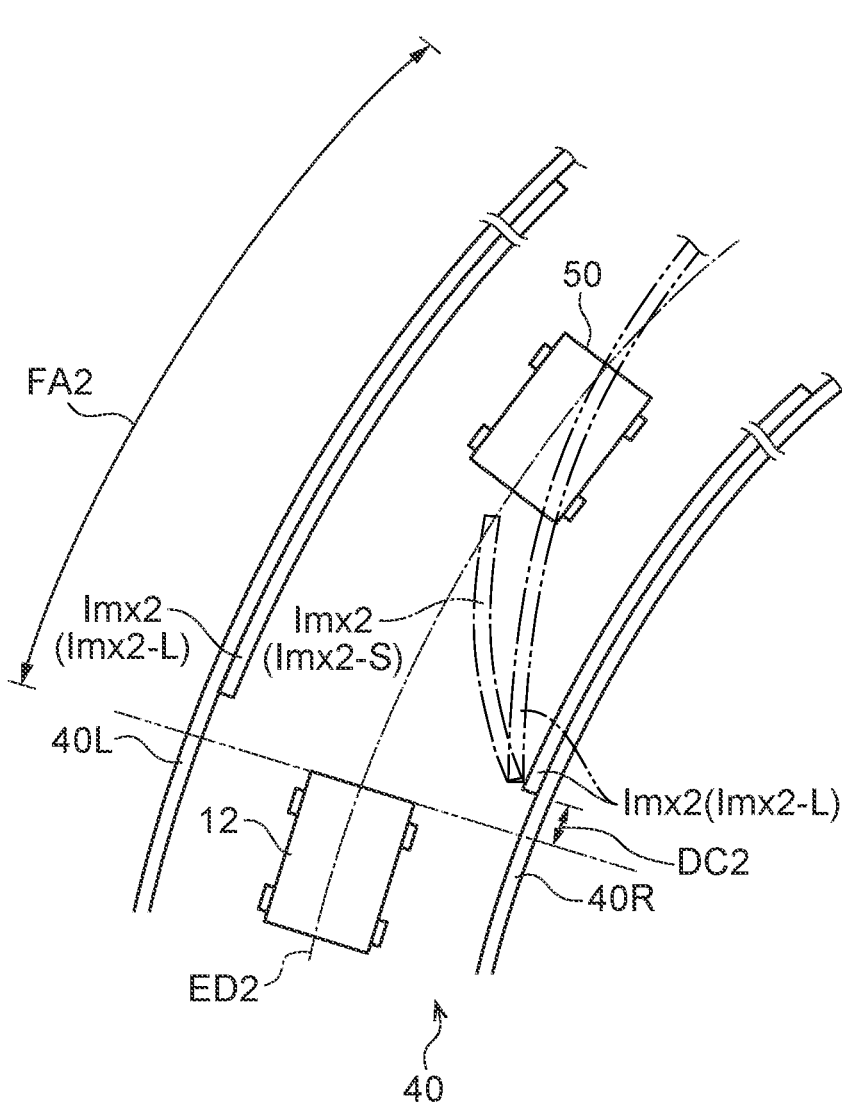
FIG. 5 is a schematic plan view of a circular arc-shaped road, a vehicle, and a preceding vehicle.

Moreover, when the vehicle 12 is executing LTA or LDA, the HUD control section 262 recognizes shapes of dividing lines provided at left and right side edges of an immediately preceding region of the road (lane) on which the vehicle 12 is traveling, based on image data acquired by the camera 21. The immediately preceding region is a region that is a part of the lane in which the vehicle 12 is traveling and that is positioned immediately ahead of the vehicle 12. A front-rear length of this immediately preceding region can be set arbitrarily, and can be set to, for example, 50 m. Moreover, based on planar shapes of the dividing lines that have been recognized, the HUD control section 262 reads, from among the projection object data, projection object data representing dividing line display images having a shape that conforms to the dividing lines that have been recognized. It should be noted that the "shape that conforms to the dividing lines" includes a shape that is the same as a portion of the dividing lines, and a shape that is similar to a portion of the dividing lines. As illustrated in FIG. 4 and FIG. 5, the type of projected dividing line display images differs depending on a planar shape of the immediately preceding region of the lane in which the vehicle 12 is traveling.

For example, a case in which the vehicle 12 is traveling on a road (lane) 30 illustrated in FIG. 4, and a planar shape of an immediately preceding region FA1 is a substantially linear shape, is presumed. A planar shape of dividing line display images Imx1 in this case is a substantially linear shape. As illustrated in FIG. 4, the HUD control section 262 forms the dividing line display images Imx1 so that a left side dividing line display image Imx1 (Imx1-L) is adjacent to a right side edge of a left side dividing line 30L that has been recognized (specified) by the HUD control section 262, and a right side dividing line display image Imx1 (Imx1-L) is adjacent to a left side edge of a right side dividing line 30R that has been recognized by the HUD control section 262. Hereinafter, as illustrated by the solid lines in FIG. 4, a formation position of the dividing line display images Imx1 in a case in which the left side dividing line display image Imx1 is adjacent to the right side edge of the actual left side dividing line 30L and the right side dividing line display image Imx1 is adjacent to the left side edge of the actual right side dividing line 30R is referred to as a design position.

However, the HUD control section 262 recognizes the dividing lines 30L and 30R based on only the image data acquired by the camera 21. In other words, the HUD control section 262 cannot use detection data from the millimeter-wave sensor 22 when recognizing the dividing lines 30L and 30R. Consequently, the HUD control section 262 may be unable to accurately recognize the positions and shapes of the dividing lines 30L and 30R in the immediately preceding region FA1. In particular, the longer a distance from the camera 21 (vehicle 12) is, the harder it is for the HUD control section 262 to recognize the positions and shapes of the dividing lines 30L and 30R. Accordingly, the HUD control section 262 determines whether or not to form the dividing line display images Imx1 and a length of the dividing line display images Imx1, based on a reliability of a detection result (image data) of the camera 21.

For example, if a characteristic amount such as sharpness or the like of sensing information acquired by the camera 21 decreases, accuracy of information relating to relative positions of the vehicle 12 and the dividing lines 30L and 30R, and shapes of the dividing lines 30L and 30R, which have been acquired by the HUD control section 262 based on the image data, decreases. Consequently, for example, the characteristic amount of the sensing information can be used as the reliability of the detection result of the camera 21.

In a case in which the acquired image data includes the dividing lines 30L and 30R, the HUD control section 262 applies the aforementioned characteristic amount of the image data to a reliability determination map (not illustrated in the drawings) recorded in the ROM 26B or the storage 26D, to determine the reliability of the detection result of the camera 21. The reliability determination map defines a relationship between the characteristic amount and the reliability. For example, the reliability determination map defines levels of reliability of from 1 to 5 according to the characteristic amount. Reliability 5 is a highest reliability, and reliability 1 is a lowest reliability.

Moreover, the HUD control section 262 applies the acquired reliability to a display image determination map (not illustrated in the drawings) recorded in the ROM 26B or the storage 26D, to determine whether or not to form the dividing line display images Imx1 (Imx2), and the length of the dividing line display images Imx1 (Imx2). For example, the display image determination map includes the following content. The length of the dividing line display images Imx1 (Imx2) is a length, in an extension direction ED1 (ED2), of the immediately preceding region FA1 (FA2). Further, in a case in which the reliability is from 2 to 5, the length of the dividing line display images Imx1 (Imx2) becomes shorter as the reliability decreases.

Content of the Display Image Determination Map

Reliability 1: dividing line display images are not formed

Reliability 2: 5 m

Reliability 3: 15 m

Reliability 4: 30 m

Reliability 5: 50 m

For example, in a case in which the reliability is 5, there is a high probability that the positions of the left and right dividing lines 30L and 30R recognized by the HUD control section 262 coincide with the actual positions of the left and right dividing lines 30L and 30R. It should be noted that, in the following explanation, the dividing line display images Imx1 illustrated by the solid lines in FIG. 4 are sometimes referred to as "dividing line display images Imx1-L". Consequently, in a case in which the reliability is 5, there is a high probability that the left and right dividing line display images Imx1-L will be formed at the design position. In other words, in a case in which the reliability is 5, as illustrated by the virtual lines in FIG. 4, there is a low probability that the left and right dividing line display images Imx1-L will be formed so that the driver recognizes that the right side dividing line display image Imx1-L is separated toward the left side from the actual right side dividing line 30R and the left side dividing line display image Imx1-L (not illustrated in the drawings) is separated toward the left side from the actual left side dividing line 30L. Consequently, in a case in which the reliability is 5, a total length of the dividing line display images Imx1 to be formed is set to 50 m. It should be noted that, in a case in which the right side dividing line display image Imx1-L is hypothetically formed at the position illustrated by the imaginary lines in FIG. 4, the driver recognizes that a portion of the right side dividing line display image Imx1-L is overlapped with a preceding vehicle (object) 50 that is traveling along the road 30 and is positioned ahead of the vehicle 12.

On the other hand, in a case in which the reliability is 2, the probability that the positions of the left and right dividing lines 30L and 30R recognized by the HUD control section 262 will be shifted from the actual positions of the left and right dividing lines 30L and 30R is higher than in a case in which the reliability is 5. It should be noted that, in the following explanation, the dividing line display image Imx1 illustrated by the single-dot dashed lines in FIG. 4 is sometimes referred to as a "dividing line display image Imx1-S". Consequently, in a case in which the reliability is 2, as illustrated by the single-dot dashed lines in FIG. 4, there is a high probability that the left and right dividing line display images Imx1-S will be formed so that the driver recognizes that the right side dividing line display image Imx1-S is separated toward the left side from the actual right side dividing line 30R and the left side dividing line display image Imx1-S (not illustrated in the drawings) is separated toward the left side from the actual left side dividing line 30L. However, in a case in which the reliability is 2, the length of the dividing line display images Imx1-S is short. Consequently, even if the dividing line display image Imx1-S is hypothetically formed at a position illustrated by the single-dot dashed lines in FIG. 4, there is a low probability that a portion of the right side dividing line display image Imx1-S will overlap with the preceding vehicle 50.

In a case in which the reliability is 3 or 4, the probability that the dividing line display images Imx1 will be formed at the design position is lower than in a case in which the reliability is 5, but higher than in a case in which the reliability is 2. Further, in a case in which the reliability is 3 or 4, the length of the dividing line display images Imx1 is longer than in a case in which the reliability is 2, but shorter than in a case in which the reliability is 5. Consequently, even in a case in which the reliability is 3 or 4, there is a low probability that a portion of the dividing line display images Imx1 will overlap with the preceding vehicle 50.

It should be noted that, in a case in which the reliability is from 2 to 5, the HUD control section 262 sets a distance DC1 in the extension direction ED1 between a front end of the vehicle 12 and the dividing line display images Imx1 to a predetermined value. The distance DC1 is, for example, 5 m.

Moreover, in a case in which the reliability is 1, there is an extremely high probability that the positions of the left and right dividing lines 30L and 30R recognized by the HUD control section 262 will be shifted from the actual positions of the left and right dividing lines 30L and 30R. However, in a case in which the reliability is 1, the dividing line display images Imx1 are not formed. Consequently, in a case in which the reliability is 1, a portion of the dividing line display images Imx1 will not overlap with the preceding vehicle 50.

Further, a case in which the vehicle 12 is traveling on a road (lane) 40 defined by left and right dividing lines 40L and 40R illustrated in FIG. 5, and a planar shape of an immediately preceding region FA2 is substantially a circular arc shape, is presumed. The planar shape of the dividing line display images Imx2 in this case is substantially a circular arc shape. It should be noted that, in the following explanation, the dividing line display images Imx2 illustrated by the solid lines in FIG. 5 are sometimes referred to as "dividing line display images Imx2-L".

For example, in a case in which the reliability is 5, there is a high probability that the positions of the left and right dividing lines 40L and 40R recognized by the HUD control section 262 coincide with the actual positions of the left and right dividing lines 40L and 40R. Consequently, in a case in which the reliability is 5, there is a high probability that the left and right dividing line display images Imx2-L will be formed at the design position. Consequently, in a case in which the reliability is 5, although a total length of the dividing line display images Imx2 to be formed is set to 50 m, there is a low probability that the dividing line display images Imx2-L will be formed so that the driver recognizes that a portion of the dividing line display images Imx2-L is overlapped with the preceding vehicle 50. Namely, as illustrated by virtual lines in FIG. 5, there is a low probability that the left and right dividing line display images Imx2-L will be formed so that the driver recognizes that the right side dividing line display image Imx2-L is separated toward the left side from the actual right side dividing line 40R and the left side dividing line display image Imx2-L (not illustrated in the drawings) is separated toward the left side from the actual left side dividing line 40L.

On the other hand, in a case in which the reliability is 2, the probability that the positions of the left and right dividing lines 40L and 40R recognized by the HUD control section 262 will be shifted from the actual positions of the left and right dividing lines 40L and 40R is higher than in a case in which the reliability is 5. Consequently, in a case in which the reliability is 2, as illustrated by the single-dot dashed lines in FIG. 5, there is a high probability that the left and right dividing line display images Imx2 will be formed so that the driver recognizes that the right side dividing line display image Imx2 is separated toward the left side from the actual right side dividing line 40R and the left side dividing line display image Imx2 (not illustrated in the drawings) is separated toward the left side from the actual left side dividing line 40L. It should be noted that, in the following explanation, the dividing line display image Imx2 illustrated by the single-dot dashed lines in FIG. 5 is sometimes referred to as a "dividing line display image Imx2-S". The length of the dividing line display images Imx2-S in this case is short. Consequently, even if the dividing line display image Imx2-S is hypothetically formed at the position illustrated by the single-dot dashed line in FIG. 5, there is a low probability that a portion of the right side dividing line display image Imx2-S will overlap with the preceding vehicle 50.

In a case in which the reliability is 3 or 4, the probability that the dividing line display images Imx2 will be formed at the design position is lower than in a case in which the reliability is 5, but higher than in a case in which the reliability is 2. Further, in a case in which the reliability is 3 or 4, the length of the dividing line display images Imx2 is longer than in a case in which the reliability is 2, but shorter than in a case in which the reliability is 5. Accordingly, even in a case in which the reliability is 3 or 4, there is a low probability that a portion of the dividing line display images Imx2 will overlap with the preceding vehicle 50.

It should be noted that, in a case in which the reliability is from 2 to 5, the HUD control section 262 sets a distance DC2 in the extension direction ED2 of the immediately preceding region FA2 between the front end of the vehicle 12 and the dividing line display images Imx2 to a predetermined value. The distance DC2 is, for example, 5 m.

Moreover, in a case in which the reliability is 1, there is an extremely high probability that the positions of the left and right dividing lines 40L and 40R recognized by the HUD control section 262 will be shifted from the actual positions of the left and right dividing lines 40L and 40R.

However, in a case in which the reliability is 1, the dividing line display images Imx2 are not formed. Consequently, in a case in which the reliability is 1, a portion of the dividing line display images Imx2 will not overlap with the preceding vehicle 50.

Among the configurations described above, the sensor unit 20, the driving assistance operation device 23, the HUD 24, the ECU 26, the sensor group, the actuator group, the reliability determination map, and the display image determination map are constituent elements of the control device 10.

Next, processing executed by the CPU 26A of the ECU 26 will be explained. The CPU 26A repeatedly executes the processing of the flowchart illustrated in FIG. 6 each time a predetermined amount of time has elapsed.

At step S10 (hereinafter, the word "step" will be omitted), the CPU 26A determines whether or not the vehicle 12 is executing LTA or LDA.

In a case in which the determination is YES at S10, the CPU 26A proceeds to S11 and determines whether or not the dividing lines 30L, 30R, 40L or 40R are included in the image data acquired by the camera 21.

In a case in which the determination is YES at S11, the CPU 26A proceeds to S12 and determines the reliability of the detection result of the camera 21 using the image data and the reliability determination map.

After completing the processing of S12, the CPU 26A proceeds to S13 and determines whether or not the reliability of the detection result of the camera 21 is any one of 2 to 5.

In a case in which the determination is YES at S13, the CPU 26A proceeds to S14 and causes the dividing line display images Imx1 or Imx2 to be formed at the HUD 24 based on the reliability.

Figure 6:
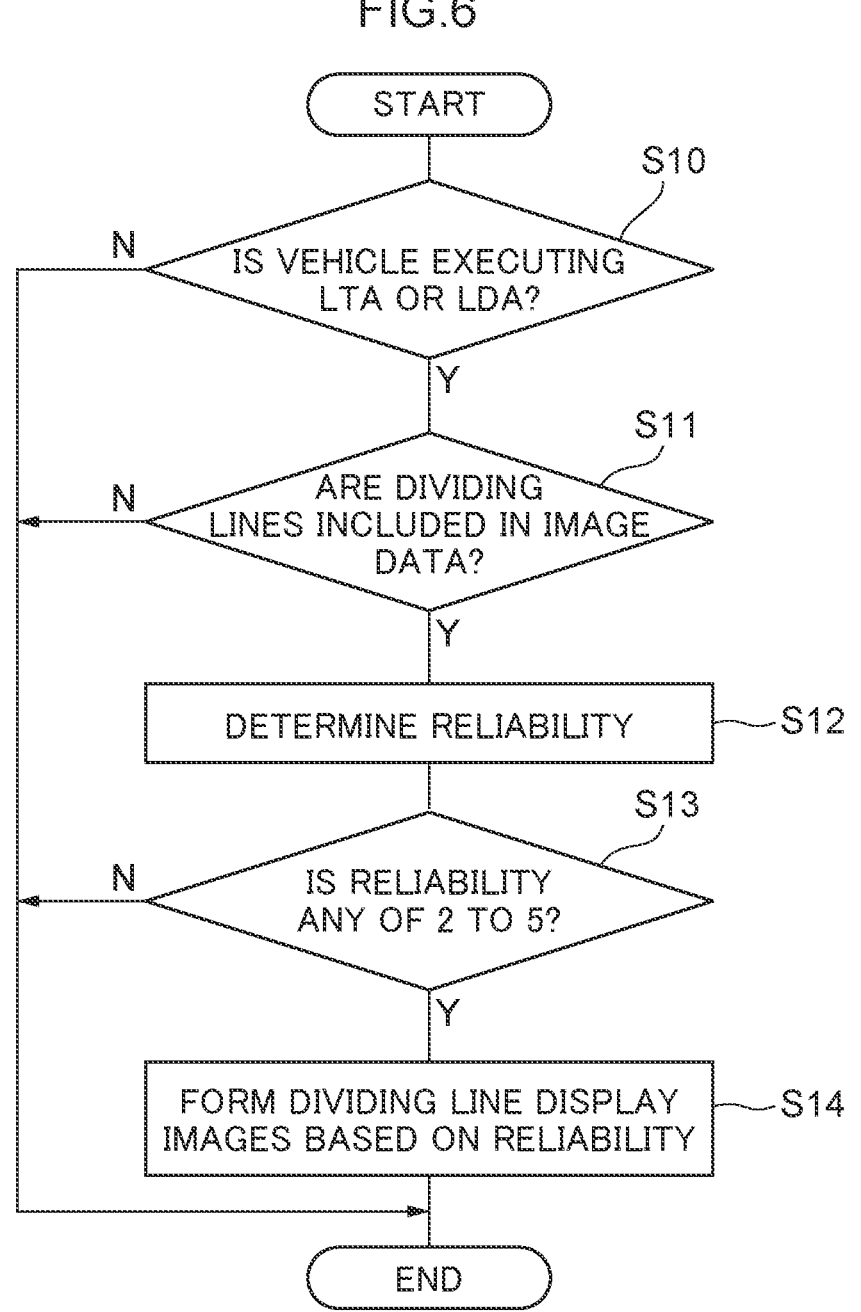
FIG. 6 is a flowchart illustrating processing executed by a CPU of the ECU.

When a determination of NO has been made at S10, 11 or 13, or when the processing of S14 has been completed, the CPU 26A temporarily ends the processing of the flowchart of FIG. 6.

As described above, the control device 10 of the present exemplary embodiment is capable of forming the dividing line display images Imx1 or Imx2 having a shape that conforms to the dividing lines 30L and 30R, or 40L and 40R, using information from the camera 21 that recognizes the dividing lines 30L and 30R, or 40L and 40R, of the road 30 or 40 on which the vehicle 12 is traveling. Moreover, based on the reliability of the detection result of the camera 21, the control device 10 determines the length, in the extension direction ED1 or ED2, of the dividing line display images Imx1 or Imx2. More specifically, in a case in which the reliability is any one of 2 to 5, the length of the dividing line display images Imx1 or Imx2 becomes shorter as the reliability decreases. In a case in which the reliability of the detection result of the camera 21 is high, there is a high probability that the dividing line display images Imx1 or Imx2 will be formed at a desired position (the design position). Consequently, in this case, there is low probability that the dividing line display images Imx1 or Imx2 having a long length will be formed so as to overlap with an object (the preceding vehicle 50) that is at a position that is separated from the dividing lines 30L and 30R, or 40L and 40R. On the other hand, in a case in which the reliability of the detection result of the camera 21 is low, although there is a high probability that the dividing line display images Imx1 or Imx2 will be formed at positions shifted from the design position, the length of the dividing line display images Imx1 or Imx2 is short, and therefore, the probability that the dividing line display images Imx1 or Imx2 will overlap with the object is low. Accordingly, the control device 10 is able to form the dividing line display images Imx1 or Imx2 so as to make it less likely for the driver (occupant) D to feel annoyance.

Moreover, when the reliability of the detection result of the camera 21 is lower than a predetermined value (reliability 2), the control device 10 does not cause the dividing line display images Imx1 or Imx2 to be formed at the HUD 24. Consequently, when the reliability of the detection result of the camera 21 is 1, there is no possibility that the control device 10 will form the dividing line display images Imx1 or Imx2 to overlap with an object that is at a position that is separated from the dividing lines 30L and 30R, or 40L and 40R.

Although explanation has been given above regarding the control device 10, the vehicle display control method, and the non-transitory recording medium according to the exemplary embodiment, these may be subjected to design modification as appropriate within a range that does not depart from the spirit of the present disclosure.

For example, in a case in which the vehicle 12 is traveling at night or in a case in which the vehicle 12 is traveling within a tunnel, an amount of captured light that is received by the camera 21 is small. In this case, the accuracy of information relating to the relative positions of the vehicle 12 and the dividing lines 30L and 30R, or 40L and 40R, and the shape of the dividing lines, that are acquired by the HUD control section 262 based on the image data is reduced in comparison to a case in which the amount of captured light that is received by the camera 21 is large. It should be noted that the HUD control section 262 is able to determine whether or not the vehicle 12 is traveling within a tunnel, based on map information of a navigation system installed at the vehicle 12 and position information of the vehicle 12 acquired by a global navigation satellite system (GNSS, global positioning satellite system) receiver installed at the vehicle 12. Consequently, the HUD control section 262 may determine the reliability of the detection result of the camera 21 based on at least one of time information or information indicating whether or not the vehicle 12 is traveling within a tunnel, which has been acquired by the HUD control section 262.

The number of levels of reliability may be a number other than five, as long as the levels are plural.

A configuration may be provided in which the CPU (control section) 26A does not cause the dividing line display images Imx1 or Imx2 to be formed at the HUD 24 in a case in which the reliability is of a higher level (for example, reliability 2) than the lowest level of reliability (reliability 1).

A sensor that is different from the camera 21 may recognize the positions and the shapes of the dividing lines of the road, and the HUD control section 262 may cause the dividing line display images (AR image) to be formed at the HUD 24 based on the reliability of the detection result of this sensor.

What is claimed is:

1. A vehicle display control device comprising:
   a processor; and
   an image forming section configured to form an AR image, having a shape that conforms to a dividing line of a lane in which a vehicle travels, using information from a sensor that recognizes the dividing line,
   wherein the processor is configured to:
   control the image forming section so as to form the AR image, and determine a length, in an extension direction of the lane, of the AR image that the image forming section is caused to form, based on a reliability of a detection result of the sensor.

2. The vehicle display control device according to claim 1, wherein the processor does not cause the image forming section to form the AR image, when the reliability is lower than a predetermined value.

3. The vehicle display control device according to claim 1, wherein the lower the reliability is, the shorter the length of the AR image that the processor causes the image forming section to form is.

4. The vehicle display control device according to claim 1, wherein the sensor is a camera, and the processor is further configured to recognize the dividing line only based on image data acquired by the camera.

5. The vehicle display control device according to claim 4, wherein a characteristic amount of the image data is used to determine a level of the reliability of the detection result of the sensor.

6. The vehicle display control device according to claim 5, wherein the processor is further configured to:

receive the image data acquired by the camera; and upon determining that the image data includes the dividing line, determine the level of the reliability by referring to a reliability determination map that associates different levels of the reliability with corresponding characteristic amounts of the image data.

7. The vehicle display control device according to claim 1, wherein the AR image is formed by the image forming section to have the determined length, and the formed AR image is displayed on a windshield of a vehicle.

8. A vehicle display control method, comprising, by a processor:

causing an image forming section to form an AR image, having a shape that conforms to a dividing line of a lane in which a vehicle travels, using information from a sensor that recognizes the dividing line; and determining a length, in an extension direction of the lane, of the AR image that the image forming section is caused to form, based on a reliability of a detection result of the sensor.

9. A non-transitory recording medium storing a program executable by a computer to perform processing, the processing comprising:

causing an image forming section to form an AR image, having a shape that conforms to a dividing line of a lane in which a vehicle travels, using information from a sensor that recognizes the dividing line; and determining a length, in an extension direction of the lane, of the AR image that the image forming section is caused to form, based on a reliability of a detection result of the sensor.

\* \* \* \* \*